Nov. 10, 1925.
G. KOMAREK
1,560,827
TRANSMISSION
Filed March 14, 1922 2 Sheets-Sheet 1
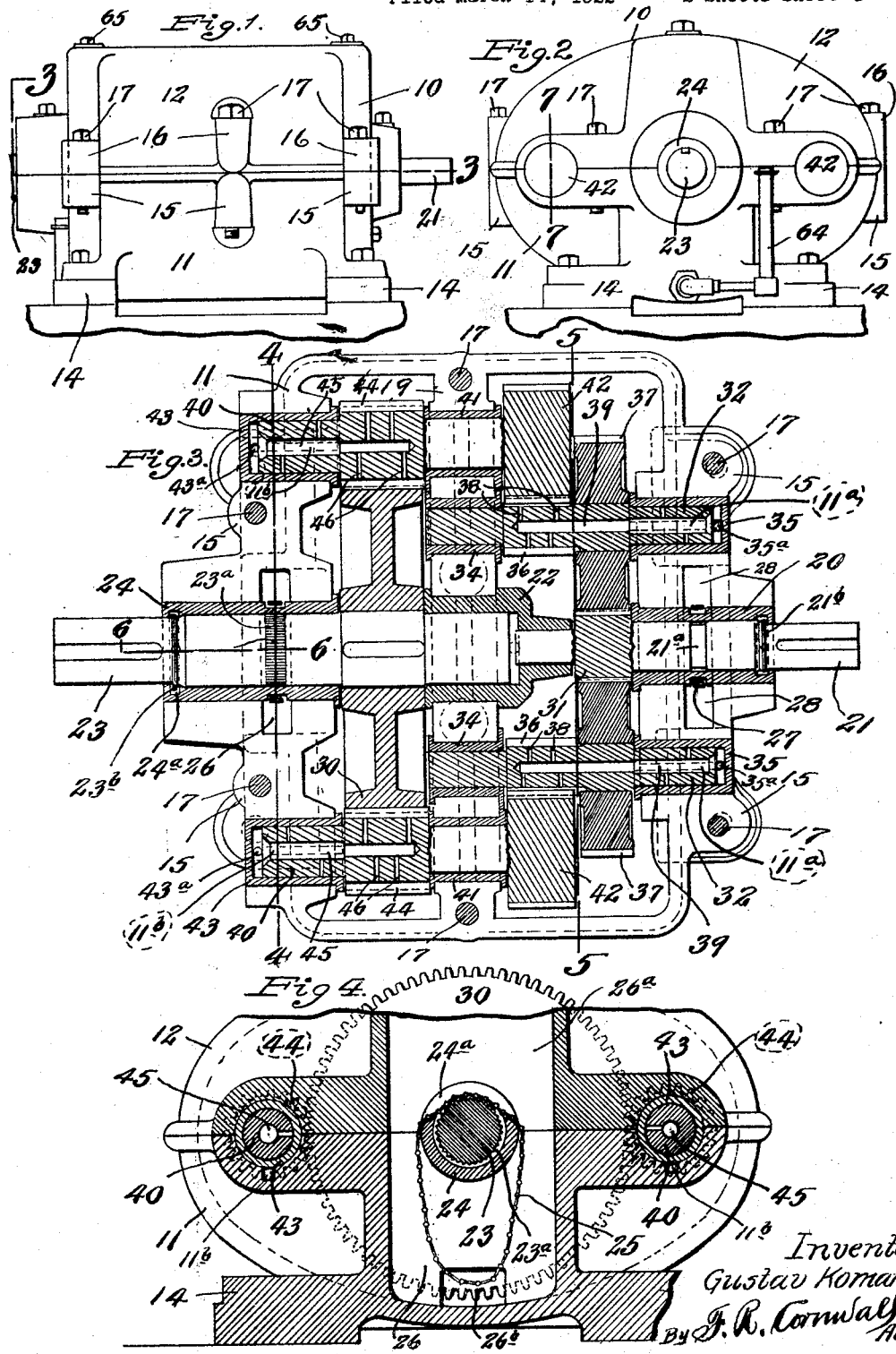
Inventor
Gustav Komarek
By J. R. Cornwall
Atty.

Nov. 10, 1925.  
G. KOMAREK  
TRANSMISSION  
Filed March 14, 1922  
1,560,827  
2 Sheets-Sheet 2
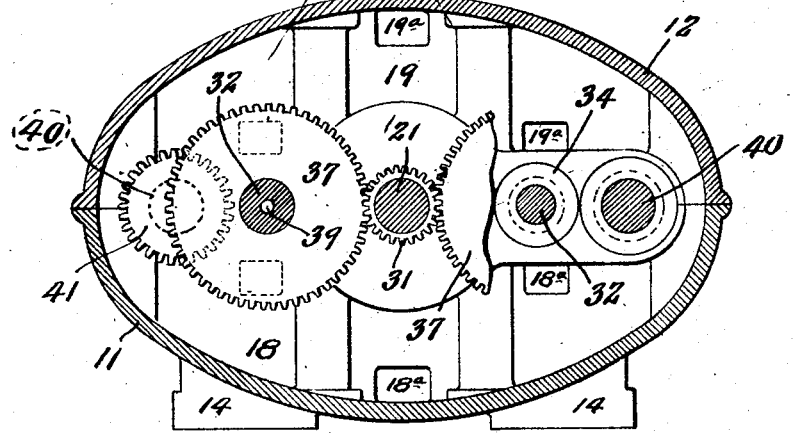
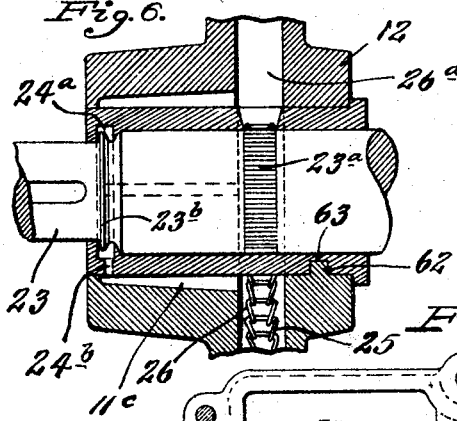
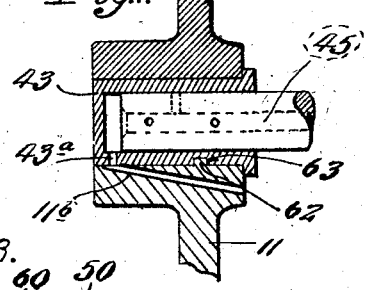
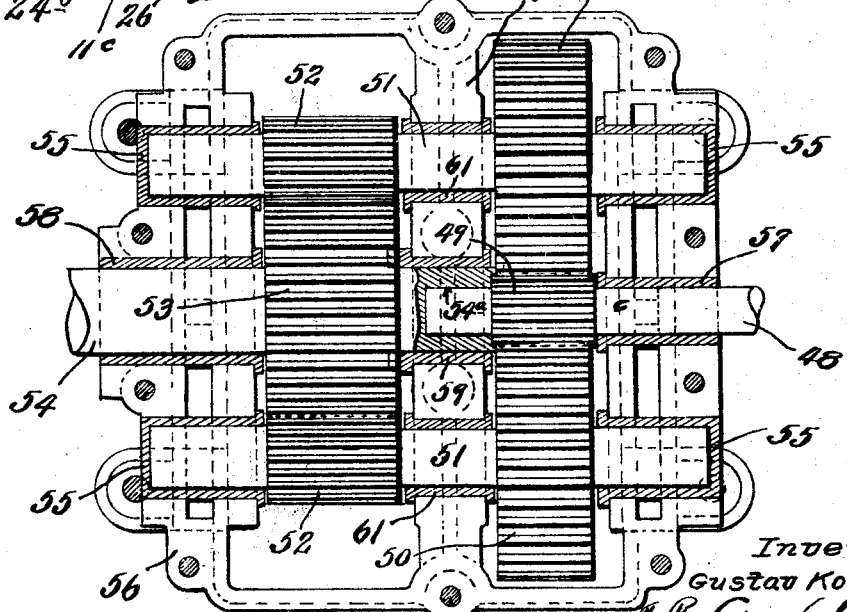
Inventor:  
Gustav Komarek  
By J. R. Cornwall Atty.

Patented Nov. 10, 1925.

1,560,827

UNITED STATES PATENT OFFICE.

GUSTAV KOMAREK, OF CHICAGO, ILLINOIS.

TRANSMISSION.

Application filed March 14, 1922. Serial No. 543,709.

*To all whom it may concern:*

Be it known that I, GUSTAV KOMAREK, a citizen of the United States, residing at Chicago, Illinois, have invented a certain new and useful Improvement in Transmission, of which the following is a full, clear, and exact description, such as will enable others skilled in the art to which it appertains to make and use the same, reference being had to the accompanying drawings, forming part of this application.

My invention relates to new and useful improvements in power transmissions, and the objects of my invention are to provide a simple and highly efficient power transmission for transforming power from low torque of high speed to high torque of low speed; to mount the operating elements in a suitable housing having a removable cover so that said elements are readily accessible for the purposes of inspection and repair; and to provide improved bearings for the shafts journaled in said housing.

Further objects of the invention are to construct a housing having oil chambers of ample capacity so that the working parts of the power transmission are partly submerged in the lubricant contained therein, and to provide improved means for forcing lubricant to the various parts of the power transmission.

Still further objects of the invention are to provide an apparatus of the class described which is simple in operation, of strong construction, and contains but few parts, thereby reducing the liability of the device getting out of order to the minimum.

With the foregoing and other objects in view, my invention consists in certain novel features of construction and arrangement of parts, hereinafter more fully described and claimed, and illustrated in the accompanying drawings in which—

Figure 1 is a side elevation of the device.

Figure 2 is an end elevation of the same.

Figure 3 is a horizontal cross section taken on line 3—3 of Figure 1.

Figure 4 is a vertical cross section taken on line 4—4 of Figure 3.

Figure 5 is a vertical cross section taken on line 5—5 of Figure 3.

Figure 6 is a vertical cross section taken on line 6—6 of Figure 3.

Figure 7 is a vertical cross section taken on line 7—7 of Figure 2.

Figure 8 is a plan view partly in cross section of a modified form with the cover removed.

Referring by numerals to the accompanying drawings, 10 designates a housing which is preferably elliptical in cross section and separable along the medial line into a base section 11 and cover 12. Base section 11 is provided with legs or standards 14 by means of which it can be bolted in position and with a series of laterally projecting lugs 15 in which are vertically disposed threaded openings which, when cover 12 is in position, are in alignment with vertical openings formed in lugs 16, which latter are arranged on cover 12. The bolts 17 are screw-seated in the threaded openings of lugs 15 and hold cover 12 in position on base 11.

An intermediate wall 18 is vertically arranged in the base section 11 and divides the same into two compartments which are in communication with each other by means of openings $18^a$ formed in said wall. A similar wall 19 having openings $19^a$ formed therein is arranged in the cover 12 in vertical alignment with wall 18 of cover section 11.

One of the end walls of section 11 is provided with a semi-circular recess in which is detachably arranged a tubular bearing 20 of a high speed shaft 21. A bearing member 22 is carried by the partition wall 18 and has a restricted end in which is journaled the inner end of shaft 21. A low speed shaft 23 is journaled in a bearing 24, detachably carried by the opposite end wall and the inner end of this shaft is also journaled in the bearing 22. Shaft 23 is provided with an annular groove $23^a$, the bottom of which is knurled or roughened and operating over this roughened knurled portion through a suitable slot $24^a$ formed in the upper portion of bearing 24 is an endless oiling chain 25. The lower portion of this chain extends downwardly into an oil well 26 formed in section 11 and contains suitable lubricant. A similar oil chamber $26^a$ is formed in cover 12 in alignment with the oil well 26.

High speed shaft 21 is provided with an annular groove $21^a$ over which operates an oiling chain 27, the lower portion of which is submerged in lubricant contained in oil well 28.

Shaft 23 has fixed thereon a comparatively large gear 30 and shaft 21 carries or has formed thereon a pinion 31.

Parallel with shaft 21 and arranged on each side thereof are counter shafts 32, the inner ends of which are journaled in bearings 34 carried by partition wall 18. The outer ends of shafts 32 are journaled in bearings 35 which latter are closed at their outer ends and are detachably fixed in the same end wall in which is arranged high speed shaft 21. A pinion 36 is formed or fixed on each shaft 32 adjacent to bearings 34 and a gear 37, which is in mesh with pinion 31 of shaft 21, is fixed on each shaft 32 adjacent to bearings 35. Each pinion 36 is provided with a plurality of radially disposed bores or apertures 38 which extend inwardly from the bases of the teeth and communicate with a bore 39 longitudinally disposed in each shaft 32. The outer ends of shafts 32 are spaced inwardly from the end walls of bearings 35 and bores 39 formed in each shaft 32 open into and communicate with the chamber thus formed in the corresponding bearing 35.

A drain opening 35$^a$ is formed in each bearing 35 and leads into a channel 11$^a$ which is formed in the end wall of base 11 immediately below each bearing 35 and communicates with the compartment formed in said housing by said end wall and partition wall 18.

A pair of counter shafts 40 are spaced outwardly from counter shafts 32 and have their inner ends journaled in bearings 41 in the partition wall 18. Integrally formed with the extreme inner end of each shaft 40 is a gear 42 which is in mesh with a corresponding pinion 36 of the adjacent shaft 32. The outer ends of shafts 40 are journaled in bearings 43 which are removably seated in the same end wall in which the low speed shaft 23 is journaled. A pinion 44 is formed integral with each shaft 40 and meshes with gear 30 of low speed shaft 23.

Shafts 40 are provided with longitudinal bores 45 which are supplied with lubricant through radially disposed ducts or apertures 46 in pinions 44. The outer ends of bearings 43 are closed and the outer ends of shafts 40 terminate short of the ends of bearings 43 so as to form a chamber in each bearing 43 through which the lubricant can be discharged from bores 45 to drain openings 43$^a$ which latter open into channels 11$^b$. These channels which are similar to channels 11$^a$ slope inwardly and return the lubricant from each bearing 43 into the compartment formed between this end wall of section 11 and partition wall 18.

Shaft 23 is provided with a circular flange 23$^b$ which operates in a circular chamber 24$^a$ and, when the shaft is rotating, deflects the oil outwardly into the recess 24$^a$, thus preventing its escape through the outer end of bearing 24. The oil is drained from said recess by means of discharge opening 24$^b$ formed in said bearing and inwardly inclined channel 11$^c$ formed in the end wall of section 11 and leading into the oil well 26.

Shaft 21 is provided with a circular flange 21$^b$ which deflects the oil and prevents its escape through the outer end of bearing 20 in a similar manner.

In Figure 8 I have illustrated a modified form of a power transmission wherein the power is transmitted from the high speed shaft 48 through pinion 49 fixed on said shaft to gears 50. These gears are fixed on counter shafts 51 journaled on the opposite sides of shafts 48. Each shaft 51 carries a pinion 52 which is in mesh with a large gear 53 fixed to a low speed shaft 54. The ends of shafts 51 are journaled in bearings 55 which are detachably arranged in the base section 56 and have their outer ends closed. Shafts 48 and 54 are journaled in tubular bearings 57 and 58, respectively, and the inner end of shaft 54 is journaled in bearing 59 carried by intermediate wall 60 of section 56 and the inner end of shaft 48 is journaled in a recess 54$^a$ formed in the inner end of shaft 54.

Bearings 61 are arranged in the intermediate walls 60 and receive the intermediate portions of counter shafts 51. The various bearings are held in their seats against rotation by means of lugs 62, one of which is formed in each bearing recess and projects upwardly into a seat 63 formed in the underside of the corresponding bearing. One end wall of base section 11 is provided with a glass gauge 64 by means of which the level of the lubricant in the housing can be ascertained.

Cover section 12 is provided in its top wall with suitable openings through which lubricant can be admitted to the housing and screw-seated and normally closing these openings are plugs 65.

Counter shafts 32 and 40 are also provided with radially disposed holes 66 through which bearings 35 and 43 are supplied with lubricant. The oil well 26 is in communication with the adjoining oil reservoir of the housing by means of an opening 26$^b$ formed in the inner wall of said oil well and oil well 28 is in a similar manner in communication with the other oil reservoir. Thus all of the oil basins or compartments of the housing are interconnected, permitting the lubricant to circulate fully through the housing.

In the operation of my device, the power is applied to shaft 21 which can be coupled directly to the motor or driven by means of belt and pulley. The rotation of this shaft actuates the inner pair of counter shafts 32 through the driving engagement of pinion 31 and gears 37. Pinions 36 of shafts 32 drive gears 41 of the outer pair of counter shafts 40, which latter transmit the power through pinions 44 to large gear 30 which is fixed to shaft 32. In this manner, the power is transmitted from the driving shaft 21 to the low speed driven shaft 23, the outer end of which can be connected in any suitable manner to the machine desired to be operated.

The level of the lubricant in housing 10 is maintained at the proper level so that the lower portions of gears and pinions are submerged in said lubricant. As gears and pinions are rotated, the teeth thereof carry the lubricant upwardly and when the teeth of the pinions engage the teeth of the gears, the lubricant is forced by the intermeshing teeth through radial apertures 38 and 46 into the longitudinal bores 39 and 45, respectively, from which it is then discharged into bearings 35 and 43.

Thus the lubricant is positively circulated through the bearings of counter shafts 32 and 40 and then returned to the oil compartments formed in the base section 11 where it is cooled and again carried upwardly by the teeth of the gears and pinions. Bearings 20 and 24 of shafts 21 and 23, respectively, are supplied with oil from oil wells 28 and 26 by means of oiling chains 25 and 27.

The bearings are located on the horizontal centerline of the housing; therefore, the oil can reach all bearings readily, that is, the rotating gears carry the oil direct to the bearings, without having to transmit it from gear to gear before it reaches the bearings; all gears and bearings therefore receive the same amount of oil, which assures uniform wear on all the working members. The high speed and low speed shafts receive their supply of oil from large oil basins which are formed or cast integral with the housing and are in reality part of the interior of the housing as they have communication with the interior of the housing through large openings which are cored through the walls separating them.

Oiling chains reach from the shaft to nearly the bottom of the oil basins; these chains ride on grooves formed or turned in the shafts. The low speed shaft has the bottom of the groove knurled; these grooves therefore serve a two-fold purpose: namely, to guide the chains so that they will not drag against the sides of the oil basins, and the knurling of the grooves on the slow speed shaft imparts motion to the oiling chains. This is important when the speeds are very low as then the chains would not turn with the shaft but would lie idly on the shaft.

The shape and form of the housing is of considerable importance not only from the standpoint of appearance but to expose the oil in the housing to a maximum of cooling surface, the elliptical cross section meets this requirement as it exposes the oil to a large amount of cooling area. The oil basins for the high speed and low speed shaft bearings are extended from the bottom to the top of the housing to provide additional cooling surface for the oil.

The low speed shaft is rigidly supported by main bearings in front of and to the rear of the large gear. These bearing supports are formed or cast integral with the housing, the rigidity of the bearing supports eliminates the necessity of using an outer or outboard bearing for the support of the low speed shaft outside of the bearing.

The bearing supports for the several trains of reduction gears are also formed or cast integral with the housing and therefore possess great rigidity. It will be noted that both the low speed and high speed shafts are journaled in a common or twin-bearing but each entirely independent of the other as the two shafts do not come in contact with each other, the large diameter being stepped down or reduced in bore to fit the smaller diameter of the high speed shaft.

The closed end walls of the outer bearings for the trains of reduction gears serve a two-fold purpose; namely, they allow a free circulation of oil in the bearings and the end walls make these bearings leak-proof against oil finding its way outside of the housing.

What I claim is:

1. In a speed transmission, the combination of a closed housing substantially elliptical in cross section and having a plurality of oil compartments formed therein, a pair of axially aligned main shafts journaled in said housing, one of said shafts being provided with a gear and the other with a pinion, counter shafts journaled in said housing, a train of reduction gearing carried by said counter shafts and in driving engagement with said gear and said pinion, bearings for said counter shafts arranged in the end walls of said housing and having their outer ends closed, said counter shafts being provided with suitable passageways through which the oil is forced by means of said reduction gearings to said closed bearings, each of said closed bearings being provided with a discharge opening and the end walls of said housing being provided immediately below said discharge opening with inwardly disposed channels by means of which the oil is returned to the oil compartments.

2. In a speed transmission, the combination of a housing comprising a base section and a cover section, each of which is provided with a transversely disposed partition wall which, when said sections are assembled, cooperate to divide said housing into two compartments, a high speed shaft journaled in one of said compartments, a low speed shaft journaled in the other of said compartments and in axial alignment with the first mentioned shaft, a bearing block carried by the partition wall of the base section and having bearings formed therein for receiving the inner ends of said shafts, a pair of counter shafts having their inner ends journaled in bearings arranged in said partition wall and their outer ends in the end wall of said housing and provided with gears which are in mesh with the pinion of the high speed shaft, a comparatively large gear fixed to the low speed shaft within said low speed compartment, a pair of counter shafts arranged in the low speed compartment and having their outer ends journaled in bearings carried by the end wall of said housing and their inner ends journaled in bearings in said partition wall and projecting therethrough into the high speed compartment, pinions fixed on the last mentioned pair of counter shafts in mesh with the gear of the low speed shaft, gears carried by the projecting ends of the last mentioned pair of counter shafts and meshing with the pinions carried by the first mentioned pair of counter shafts, there being oil wells formed in the end walls of said housing, which have communication with said compartments, and means for conveying oil from said oil wells to the bearings of said high speed and low speed shafts.

3. In a speed transmission, the combination of a housing comprising a base section and a cover section, the contiguous faces of which are provided with registering bearing recesses, a pair of axially aligned main shafts, one of which is provided with a gear and the other with a pinion, bearings for said shafts arranged in certain of said recesses, a plurality of counter shafts, bearings therefor arranged in certain other recesses, the outer ends of the last mentioned bearings being closed and the outer ends of said counter shafts having suitable passageways formed therein for receiving and conveying the lubricant to said bearings, and reduction gearing arranged on said counter shafts and in driving engagement with said pinion and said gear.

4. In a speed transmission, the combination of a housing provided with a plurality of oil reservoirs, a high speed shaft journaled in bearings in said housing and provided with an annular groove, and endless oiling chain operating in said groove and extending downwardly within one of said oil reservoirs, a low speed shaft journaled in bearings in said housing in axial alignment with said high speed shaft and provided with an annular groove, the bottom of which is knurled, an endless oiling chain operating in said groove and extending downwardly into one of said oil reservoirs, a pair of inner counter shafts journaled in bearings in said housing and having gears which mesh with the pinion of the high speed shaft, a pair of outer counter shafts having gears which mesh with the pinions carried by said inner counter shafts and provided with pinions which mesh with the gear of the low speed shaft, the bearings for said counter shafts carried by the end walls of said housing having their outer ends closed, there being a discharge opening formed in each of said bearings, and said end walls having formed therein downwardly and inwardly inclined channels which connect discharge openings of the respective bearings with the oil compartments formed in said housing, said counter shafts being provided with suitable oil ducts through which the oil is supplied to said bearings.

5. In a speed transmission, the combination of a sectional housing separable along a medial line, each section being provided with a transverse wall, thereby dividing each section into two gear chambers, bearing supports formed integral with said sections, bearings in said supports, a driving shaft journaled in certain of said bearings and provided with a driving pinion, a driven shaft journaled in certain other bearings coaxially with said driving shaft and provided with a driven gear, and a series of intermediate shafts arranged in pairs on each side of said main shafts and in the same plane with each other and with said main shaft, said intermediate shafts having intermeshing gears, the outer ends of the bearings for the outer ends of said intermediate shafts being closed to prevent escape of oil therefrom, there being a gear on one of each pair of said intermediate shafts meshing with the pinion of the driving shaft and there being a pinion on the other one of each pair of said intermediate shafts meshing with the gear of the driven shaft whereby the last-mentioned pinions are spaced suitable distances from said driven shafts so that the gear carried by the last mentioned shaft is of substantially larger diameter than any one of the intermediate gears.

6. In a power transmission device, the combination of a sectional housing separable along a medial line, each section being provided with an integral transverse wall dividing such section into two gear chambers, cooperative sectional bearing supports formed integral with each section, bearings mounted in said supports in horizontal plane with said medial line, a high speed shaft journaled in certain of said bearings and provided with a pinion, a low speed shaft journaled in certain other bearings in coaxial alignment with the first shaft and provided with a comparatively large gear, a counter shaft arranged in said bearings on each side of said high speed shaft and provided with a pinion and a gear, the latter being in mesh with the pinion of said high speed shaft, an intermediate shaft arranged in bearings in said housing and spaced outwardly from each counter shaft, said counter shafts and said intermediate shafts being disposed in the same plane with said high and low speed shafts, and having a gear meshing with the pinion of the respective counter shaft and a pinion meshing with the large gear carried by the low speed shaft whereby said gear is proportionately larger than any one of the intermediate gears and is in balanced driving engagement with the diametrically opposed pinions.

7. In a speed transformer, the combination of a housing having a plurality of bearing supports formed integral therewith, said housing and said bearing supports being separable along a median line, a low speed shaft having a gear and provided with an annular groove, the bottom of which is roughened, an endless oiling chain operating over said roughened bottom of said groove, a high speed shaft axially aligned with said low speed shaft and provided with a pinion, bearings for said shafts detachably arranged in certain of said bearing supports, trains of reduction gearing in driving engagement with said gear and pinion, bearings for said reduction gearing, said bearings having their outer ends closed, said reduction gearing being arranged to force oil into said closed end bearings, there being formed in said bearings and their respective supports passageways through which the oil is returned into the housing, said bearings and the parts journaled therein being supported by the lower half of said housing so that the upper half can be removed without displacing the operating elements thereof.

In testimony whereof I hereunto affix my signature this 2nd day of March, 1922.

GUSTAV KOMAREK.